May 1, 1951  R. L. JEAN-BAPTISTE SANMORI  2,551,054
VEHICLE DOOR
Filed March 16, 1946  7 Sheets-Sheet 1
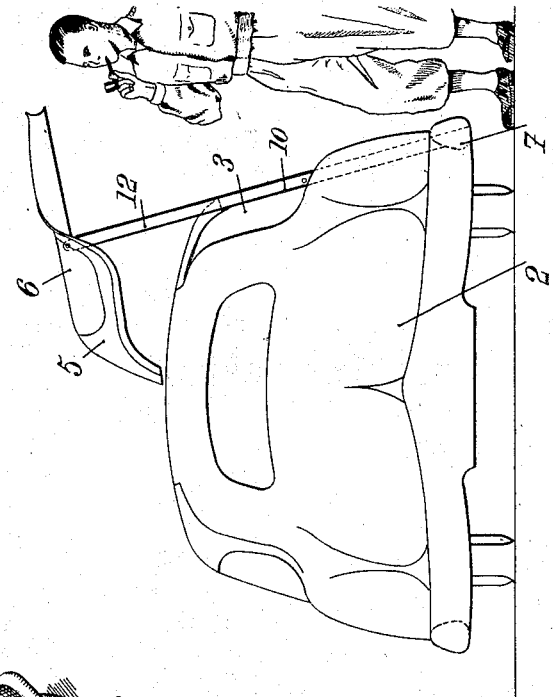
Fig.2.
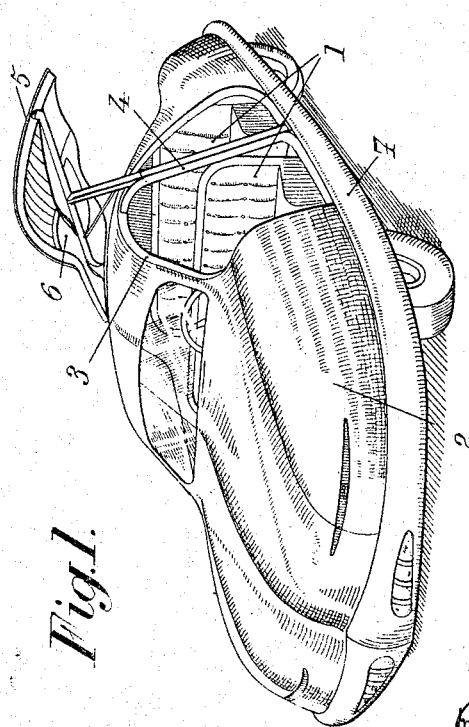
Fig.1.
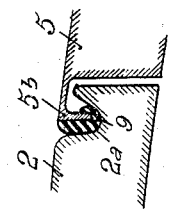
Fig.4-b.
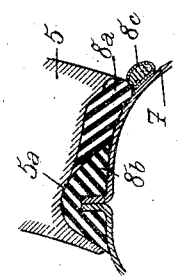
Fig.4-a.
INVENTOR
Roger Laurent Jean-Baptiste Sanmori
BY
Mock & Blum
ATTORNEYS May 1, 1951 R. L. JEAN-BAPTISTE SANMORI 2,551,054
VEHICLE DOOR
Filed March 16, 1946 7 Sheets-Sheet 2
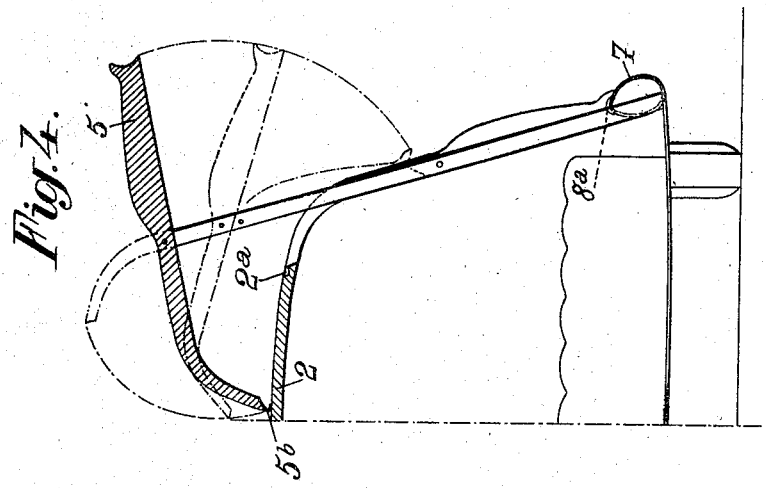
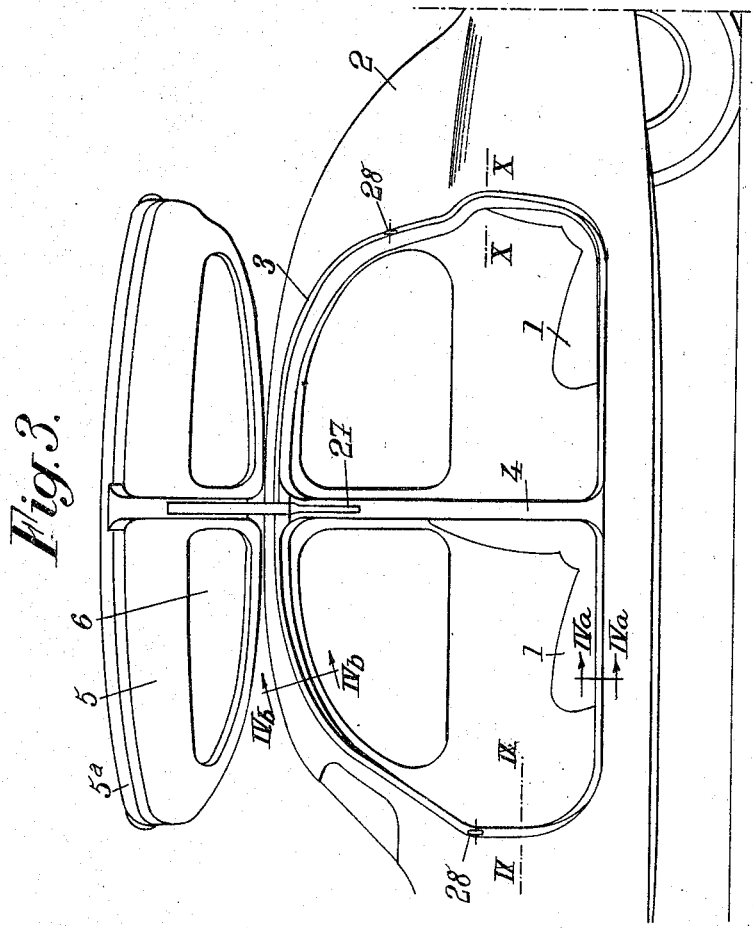
INVENTOR
Roger Laurent Jean-Baptiste Sanmori
BY Moeh + Blum
ATTORNEYS May 1, 1951 R. L. JEAN-BAPTISTE SANMORI 2,551,054
VEHICLE DOOR
Filed March 16, 1946 7 Sheets-Sheet 3
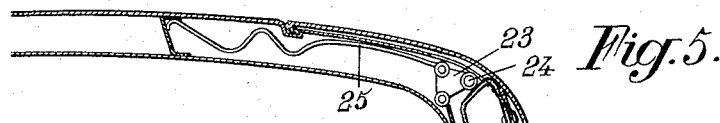
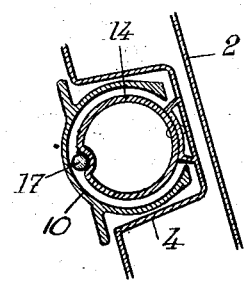
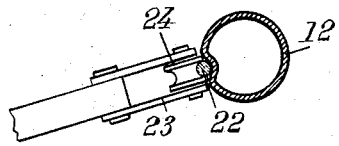
INVENTOR
Roger Laurent Jean-Baptiste Sanmori
BY Moek + Blum
ATTORNEYS

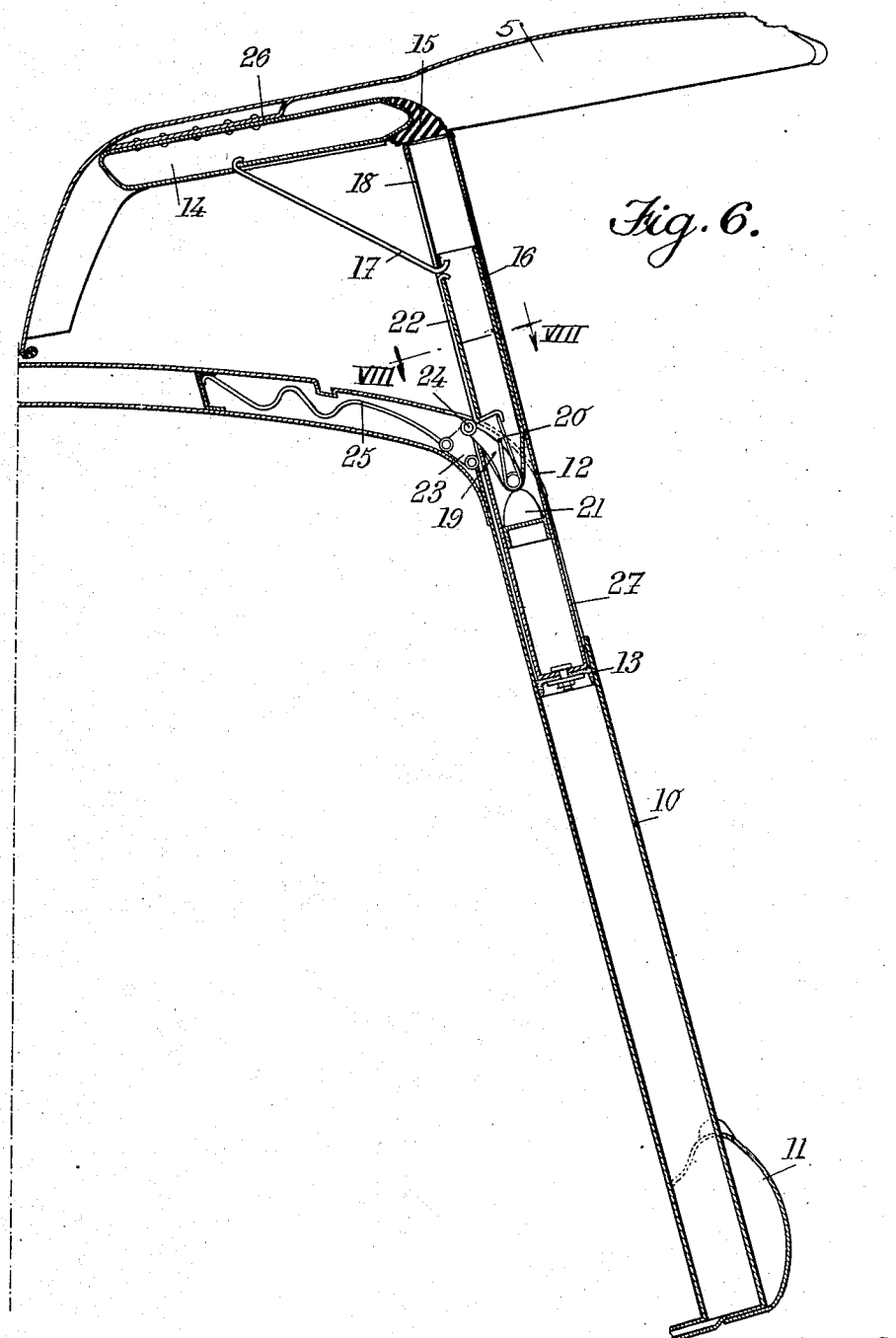

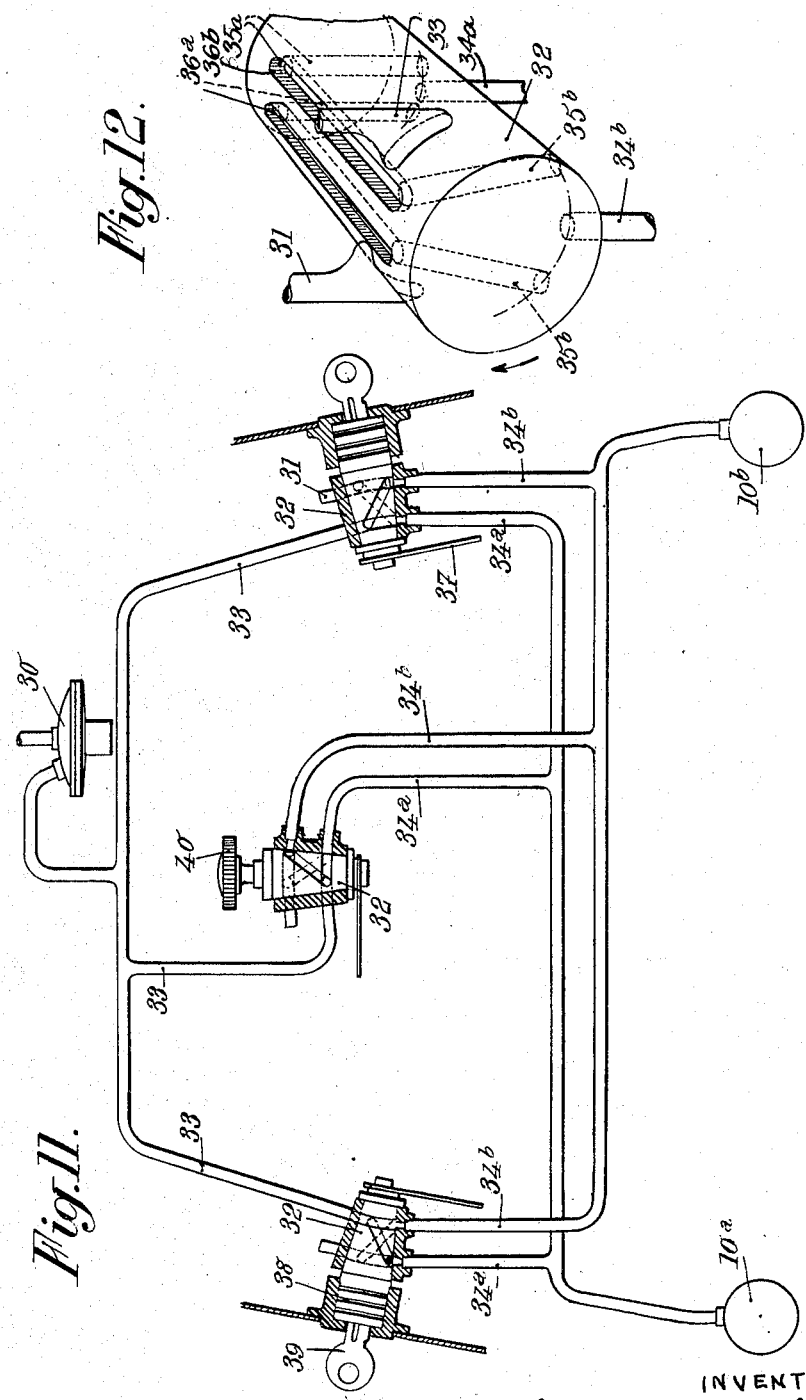

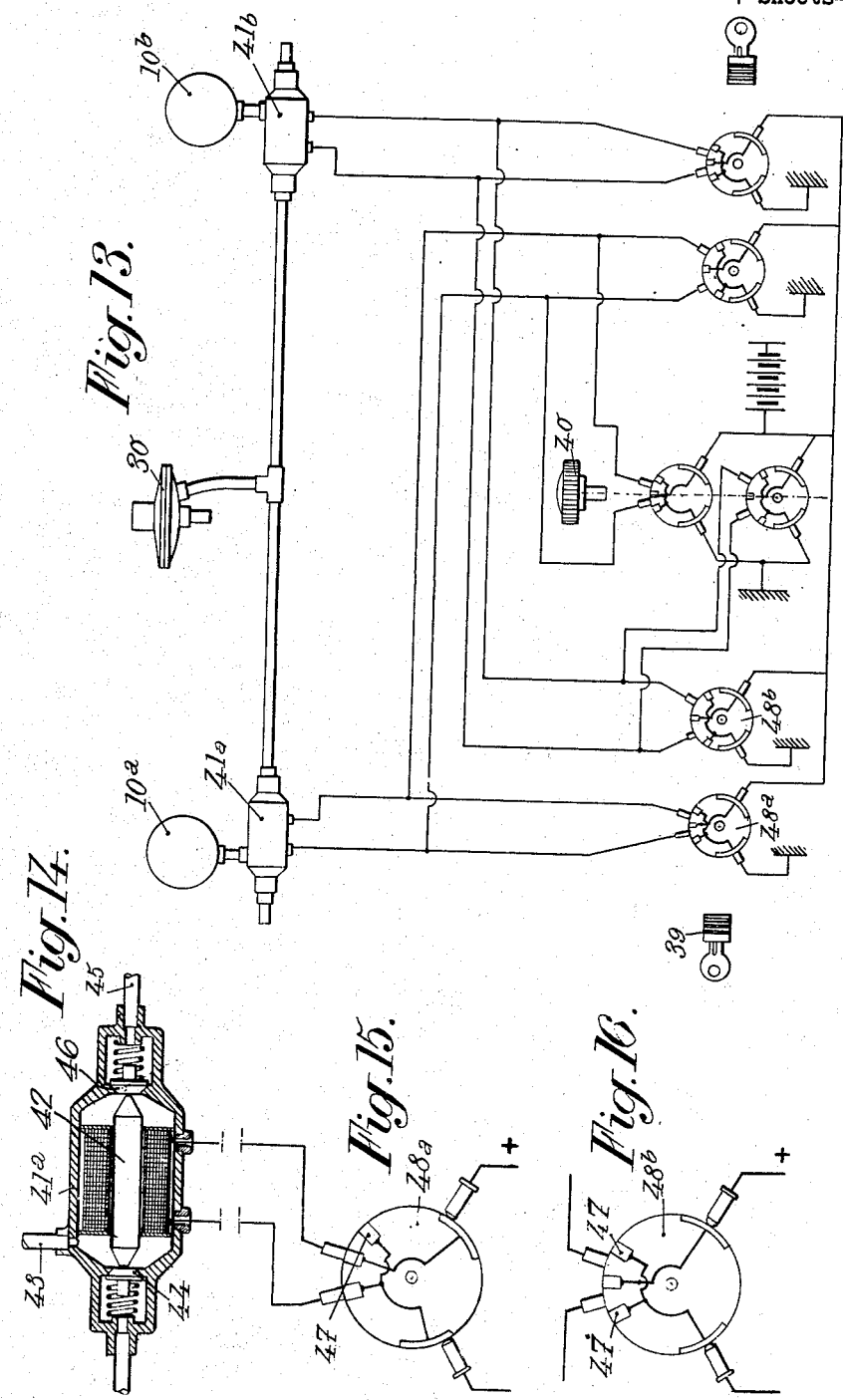

May 1, 1951 R. L. JEAN-BAPTISTE SANMORI 2,551,054
VEHICLE DOOR
Filed March 16, 1946 7 Sheets-Sheet 7

INVENTOR
Roger Laurent Jean-Baptiste Sanmori
BY Mock + Blum
ATTORNEYS

Patented May 1, 1951

2,551,054

UNITED STATES PATENT OFFICE 2,551,054

VEHICLE DOOR

Roger Laurent Jean Baptiste Sanmori,
Monaco, Monaco

Application March 16, 1946, Serial No. 654,834
In France August 2, 1945

12 Claims. (Cl. 296—44)

1

The present invention relates to doors for vehicles and more especially, although not exclusively, automobile vehicles.

Its object is to provide a device of this kind which is better adapted to meet the requirements of practice than those used up to this time, especially concerning facility of entering the vehicle.

Other objects of my invention will result from the following detailed description of some specific embodiments thereof with reference to the accompanying drawings, given merely by way of example, and in which:

Fig. 1 is a perspective view of an automobile vehicle fitted with lateral doors made according to my invention;

Fig. 2 shows the same vehicle, seen from the rear, one of the doors being shown in the opened position;

Figs. 3 and 4 show the same vehicle, with parts cut away for Fig. 4, respectively in side view and in transverse half-section, the door being still shown in the opened position;

Figs. 4a and 4b show, in section on the lines IVa—IVa and IVb—IVb, respectively, of Fig. 3 and on a larger scale, details of the door packing means, the door being supposed to be closed;

Figs. 5 and 6 are axial sectional views of the door control device, these views corresponding respectively to the closed position and the opened position of the door;

Figs. 7 and 8 show, in section on the lines VII—VII of Fig. 5 and VIII—VIII of Fig. 6, respectively and on an enlarged scale certain parts of the door control and guiding means;

Figs. 9 and 10 are enlarged cross sections of the doors, made respectively on the lines IX—IX and X—X of Fig. 3;

Fig. 11 is a diagram illustrating the door pneumatic control means;

Fig. 12 shows, in perspective view and on an enlarged scale, an element of the cock of the control means shown by Fig. 11;

Fig. 13 is a diagram of the electric control means for a vehicle door according to the invention;

Fig. 14 shows, in axial section and on an enlarged scale, an electro-magnetic valve belonging to this electric control means;

Figs. 15 and 16 show two different working positions of a switch belonging to this means;

Figure 18:
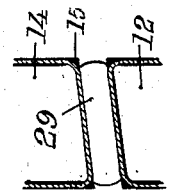
Figs. 17 and 18 are two axial sections at 90° to each other, showing a modification of the door mounting of Figs. 5 and 6.

It will be supposed, first, that the invention is applied to the case of a touring car in which the passenger seats are disposed in two rows.

I provide, in the sides of the body 2 of this car,

2 at least one opening 3, for instance, as shown by Fig. 1, one on either side of said body. Preferably, this opening is made sufficiently large for giving access to both the front and rear seats and, on the other hand, it is braced by an upright 4 adapted to improve the rigidity of the body and serving, advantageously, to support part of the door control and guiding means, as it will be hereinafter more fully explained.

I provide, for closing this opening 3, a panel 5, for instance fitted, in the usual manner, with lateral windows 6, which panel is preferably made, as shown by Fig. 1, of curved shape so that when it closes opening 3 it completes the streamlined shape of body 2.

According to an important feature of my invention, I provide means for controlling the displacements of this panel 5 in such manner that the whole thereof, during the opening operation, undergoes first an upward movement, in a direction substantially parallel to the side of body 2, and then a swinging movement which brings the top part of panel 5 toward the longitudinal axis of the vehicle so that, at the end of the opening displacement, the panel in question is in a position such (as shown by Figs. 1 and 2) that it overhangs opening 3.

It will be readily understood that if the system is arranged in such manner that, at the end of the opening displacement, panel 5 is in a substantially horizontal position and is substantially above the level of the upper edge of opening 3, it is possible to have this opening extending relatively far toward the middle vertical plane of the vehicle, at the upper part thereof, which obviously ensures an easy access to seats 1, while ensuring a satisfactory protection of said seats for the open position of the door, owing to panel 5 which forms a kind of roof over said opening.

It will be possible for a passenger to enter the vehicle and occupy a seat 1 without having to bend his head, which passes easily through the top part of opening 3, the latter extending, as above stated, sufficiently far toward the middle vertical plane of the vehicle.

A first consequence of this arrangement is that it permits of considerably reducing the height of the body 2 of the vehicle, since it suffices to calculate this height so that the passenger can sit freely inside the body after closing of the doors.

Another consequence is that it is possible to give the cooperating edges of door 5 and of its frame (this work designating the portion of body 2 just surrounding opening 3) shapes such that said door is tightly wedged in said frame in the closed position, these edges being adapted to tail in each other. This is made possible by the fact that the door undergoes, at the end of its closing displacement, a substantially translatory displacement in a direction parallel to the plane of opening 3.

An example of such an arrangement is illustrated by Figs. 3, 4, 4a and 4b of the drawings.

As shown in particular by Fig. 3, the outline of opening 3 is so shaped that, in the lower portion thereof, the width of said opening goes increasing from the bottom upwardly, or at least does not decrease, so that the lower portion of the door can be brought into engagement with the corresponding portion of the edge of said opening by a translatory sliding displacement in the plane of said opening.

The edge of this lower portion of the door is given a grooved shape, as shown at 5a (Fig. 4a) adapted to tail on the corresponding portion of the frame and in particular on the upper portion of girder 7 of the frame which constitutes the bottom edge of the opening.

I interpose, between the cooperating edges of said portions of the door and of the opening, an elastic joint a portion of which 8a is carried by the door while the other portion 8b is provided on the upper part of girder 7. This joint acts both as a fluidtight packing element and, if it is made sufficiently high and sufficiently resilient, as safety means for preventing injury of the passenger's fingers when the door is being closed.

The inner side of the opening edge is further fitted with a packing member 8c which also has a decorative effect.

Advantageously, as shown by Fig. 4b, the upper portion of door 5 is fitted with a hooked edge 5b adapted to engage, at the end of the closing movement into a groove 2a formed in body 2 slightly above the upper edge of opening 3. A packing member 9 is interposed between flange 5b and groove 2a. This groove 2a constitutes an invisible gutter for deviating toward the sides of opening 3 any amount of water as might have leaked in past member 9.

It will be readily understood that with such a fitting of the door in its opening, the fact that the lower portions of the cooperating edges of said door and said opening are wedged in one another prevents any accidental transverse displacements of the door toward the outside of the vehicle.

Furthermore, the door is so incorporated in the body 2 of the vehicle that the rigidity and strength of the whole are improved without involving any supplementary risk of jamming.

Preferably, according to my invention, the movement of the door is obtained through a single central control system, thus grouping most of the control means on the particularly strong element of the body constituted by bracing upright 4.

According to this arrangement, the stresses applied to the door for operation thereof will be applied in the vicinity of the center of gravity thereof, so that a relatively important portion of said door will be in overhanging position. This might involve risks of an accidental shock or stress applied to the door fouling the control system, which would displace panel 5 with respect to opening 3 and might cause jamming of the door on the next closing operation.

In order to obviate this possible risk, according to the invention:

I provide gradually acting guiding means, that is to say means adapted, during the initial part of the closing displacement of door 5, to limit the detrimental displacements thereof, and, during the end of the closing operation, to act in a positive manner for accurately bringing said door into the position it is to occupy with respect to opening 3.

If a source of pneumatic energy is available on the vehicle it is advantageous to make use of a control system of the kind illustrated by Figs. 5 and 6. According to this embodiment, I provide, in the central upright 4 of opening 3, which upright is supposed, as shown by Fig. 7, to be hollow, a control cylinder 10 connected, at its lower end, with the compressed air reservoir 11 of the vehicle, with the interposition of suitable distributing means as will be hereinafter described.

This cylinder cooperates with a plunger piston 12 advantageously provided, at its lower end, with a packing member 13.

Door 5 is connected to piston 12 through an arm 14 adapted to engage, at least partly, into cylinder 10 at the end of the door closing operation.

Arm 14 is fixed to door 5, and its lower end, advantageously of bevelled shape, is pivotally connected to the upper end of piston 12 through a rubber block 15 in such manner as to permit the following operations:

(a) From a kinematic point of view, arm 14 and the door fixed thereto pivot, during the second part of the opening operation, with respect to piston 12 so as to come substantially at right angles thereto;

(b) From a dynamic point of view, during the opening operation, thrust efforts are transmitted to arm 14, and during the closing operation, said arm receives a reaction tending to straighten up said door as soon as this operation is started; and (c) Also from a dynamic point of view, secondary movements of slight amplitude of arm 14 take place with respect to plunger piston 12 in such manner as to render possible, by stretching, bending or compression of rubber block 15, auxiliary displacements of door 5 adapted to facilitate the gradual action of the guiding means that will be hereinafter described.

Means are provided for automatically and gradually producing, near the end of the upward displacement of door 5, a breaking of the system constituted by plunger piston 12, block 15 and arm 14 such that door 5 passes from a substantially vertical position to the substantially horizontal position that it is to occupy at the end of the opening operation. Said means are for instance constituted as follows:

(a) By connecting arm 14 to a piece 16, slidable inside piston 12, through a rod 17 extending through a slot 18 provided in the wall of said piston 12 along a generatrix thereof;

(b) By providing sliding piece 16, at the lower end thereof, with a pivoted finger 19 projecting slightly to the outside of said piece 16 through slot 18 and subjected to the action of a spring 20 which tends to apply it against the inner wall of cylinder 10;

(c) By providing, near the lower end of piston 12, and on the inside thereof, an abutment 21, for instance of rubber, arranged to limit the upward movement of said piston 12 by contact with sliding piece 16 after the latter has been itself stopped as it will be hereinafter explained;

(d) By providing said sliding piece with guiding means adapted to prevent it from turning about its axis; said guiding means may for instance be constituted by a rod 22 engaged in slot 18, said rod having its hooked upper end engaged in a hole of the wall of piece 16 and being kept in proper position by the action on its lower end of a suitable spring, for instance spring 20 above mentioned; and (e) By providing, across the path of travel of sliding piece 16, an abutment adapted to coact with the sliding piece for stopping the upward movement thereof at the proper time.

Such an abutment may for instance be carried by a mechanism serving at the same time to lock the whole of the control system in the position corresponding to the closing of the door. Such a mechanism is for instance constituted by a rocking member 23 provided with a roller 24 and subjected to the action of a spring 25, said member 23 being arranged in such manner that, on the one hand, once the door is closed, roller 24 comes into contact with the upper face of arm 14 so as to lock the system in an elastic manner and, on the other hand, as soon as the opening operation has started, said roller occupies, as a consequence of a rocking displacement of member 23 which reduces and even eliminates the action of spring 25, a position in which it projects across the path of travel of finger 19.

The means for gradually causing door 5 to come into wedging engagement with the lower part of its frame are constituted as follows:

Partly by the door kinematic control system, that is to say by the combination of piston 12 and arm 14, the gradual guiding action being obtained when arm 14 comes to slide with a snug fit inside cylinder 10; and Partly by fitting parts rigid respectively with body 2 and with door 5 with guiding elements and slideway elements disposed in such manner as to come into action when the door is already relatively close to its closed position. Said parts are arranged in such manner that the slideway elements engage the guiding elements even if the door initially does not register exactly with its frame.

For instance arm 14 carries a boss 26 adapted to coact with a guiding groove 27 provided in the upper part of upright 4, said boss engaging said groove, near the end of the door closing operation, with a play which grows smaller and smaller as the door is moving down.

On the other hand, the coperating contact surfaces of door 5 and opening 3 are given an inclination such that they diverge toward the outside of the vehicle as shown by Figs. 9 and 10.

Furthermore, the periphery of opening 3 is advantageously provided with a plurality of guiding means such for instance as slideways or rollers 28 on which the door comes to bear at the end of the closing operation.

It will be readily understood that if the door were slightly oblique with respect to its opening when it engages said opening, and accordingly first came into contact with only one of these guiding means 28, the combined action of the control system which tends to apply the door against the lower edge of its opening 3 and of the gradual guiding means constituted by the inclined cooperating edges of the door and its opening will have for its effect to bring panel 5 into contact with the whole of the guiding means, that is to say into a position from which it will be positively led to the proper final position.

This system works as follows:

The door is supposed to be closed. Compressed air fed through distributing means which will be hereinafter described is admitted into the lower end of cylinder 10 and tends to lift piston against the action of spring 25 transmitted through rocking member 23 and roller 24 to the head of arm 14 (position shown by Fig. 5). The pressure rises until it is sufficient to overcome the action of said elastic locking means, but the action of the latter decreases as rocking member 23 is pivoting. Piston then moves upwardly, together with rubber block 15, arm 14 and door 5. Said door is then moving with a translatory displacement in a plane that coincides substantially with its initial plane until finger 19 comes into contact with roller 24 acting as an abutment. The stopping of finger 19, and therefore of sliding piece 16, has for its effect to immobilize the lower end of rod 17, whereas piston 12 is free to move upwardly, owing to the provision of slot 18 which enables rod 17 to pass through said piston.

Arm 14 and door 5 which is fixed thereto are now subjected to a double action, to wit on the one hand that of piston 12 which tends, through rubber block 15, to push arm 14 upwardly and, on the other hand, that of rod 17 which tends to retain said arm 14. Combination of these two actions then causes arm 14 to pivot with respect to piston 12 about rubber block 15 acting as a hinge. This pivoting is facilitated by the fact that the lower end of arm 14 is bevelled with its edge substantially parallel to the fore-and-aft direction of the vehicle. This pivoting movement is pursued until door 5 has come into the substantially horizontal position shown by Fig. 6 which corresponds to the coming of abutment 21 into contact with the lower end of sliding piece 16. In this position, the door is fully opened and its upper edge may come to bear upon the roof of the vehicle.

The closing operation takes place in the reverse order of elementary operations, started by the placing of cylinder 10 into communication with the atmosphere.

It will be seen that, in the opened position, the door is located on one side of the longitudinal middle plane of the vehicle. As the vehicle is fitted with two doors, if the opening of both of these doors is to produce no increase of the transverse dimension of the vehicle, the total height of each door should not be greater than at most one half of the width of the vehicle. This is generally the case with touring cars.

Figure 19:
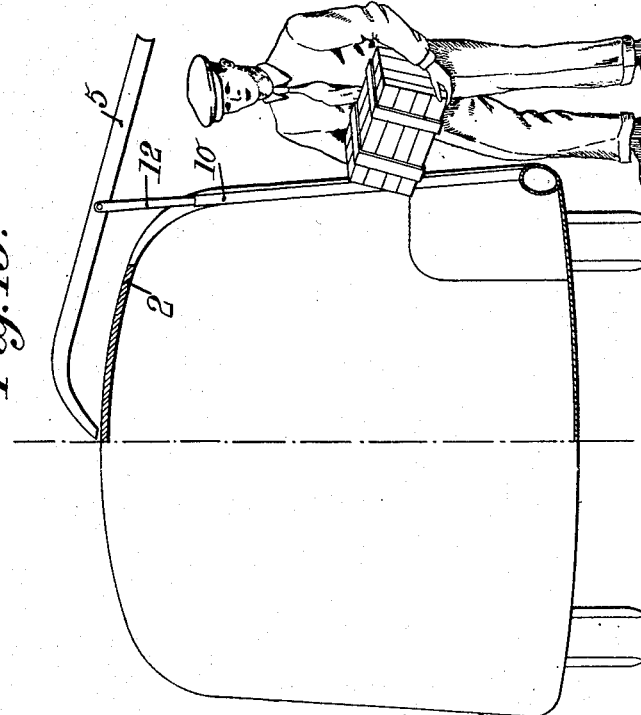

When the height of the door is greater than one half of the width of the vehicle, which is often the case with commercial and similar vehicles, such as that shown by Fig. 19, care will be taken that the upper edge of the door comes, in the open position, substantially in the longitudinal middle plane of the vehicle, and the lower edge of said door will project beyond the vertical plane tangent to the side wall of the vehicle.

Figure 17:
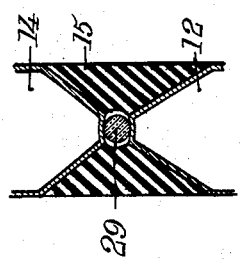

It should be noted that it is possible, for instance by means of the modification illustrated by Figs. 17 and 18 further to facilitate the pivoting of door 5 against the action of perturbing auxiliary movements by interposing between the bevelled end of arm 14 and the upper end of piston 12 supposed to be also of bevelled shape, a tube 29 inserted in a housing provided for this purpose in rubber block 15, parallel to the edges of the bevelled ends of pieces 12 and 14. It will suffice, in order to insert this tube 29 in position, to move pieces 12 and 14 away from each other after block 15 has been fixed thereto by vulcanizing. I may even, by disposing tube 29 obliquely with respect to the general axis of the sliding parts, as shown by Fig. 18, create a preferential plane of breaking of the combined rod constituted by part 12 and 14 so that, when the door is inclined in the closed position, for instance toward the rear of the vehicle, it however comes into substantially horizontal position at the end of the opening operation.

This system has, among others, the following important advantages:

It is simple and strong, due to the elimination of hinges.

The opening in the body is cleared to the maximum degree due to the lateral retraction of the door up to a high level.

The height of the vehicle can be reduced, while facilitating access to the seats and ensuring a good protection of said seats against rain or the like when the door is in the opened position.

The strength of the body, in the case of stressed skin construction, is increased, since the door is incorporated therewith.

A supplementary locking is obtained due to the fact that the door is wedged with respect to the edge of its opening, in the bottom part thereof, whereby noisy vibrations are eliminated.

The whole system is stable in the opened position owing to the fact that the pivot block 15 is located close to the center of gravity of the door.

Finally, a fluidtight closing is obtained owing to the provision of contact joints at the lower part and of an invisible trough such as 2a at the upper part.

I will now describe the tele-control means for placing each of the door operating cylinders 10a and 10b in communication either with a source of pressure, such as the output of a pressure relief device 30, for opening the door or with a discharge conduit, for closing said door.

Said means may be:

Either wholly automatic, the opening of the doors being for instance produced by a mechanism adapted to act as soon as the vehicle is stopped, while the starting thereof causes said doors to be closed;

Or, as it will be supposed hereinafter, manually controlled, and preferably arranged in such manner that a single control member permits of acting, at will, according to the amplitude of the displacements imparted thereto, either on one or on the other of the doors of the vehicle, which makes it possible to lock or to open both of said doors by a single operation, whatever be the side of the vehicle on which is placed the driver or passenger that is performing this operation.

The control means may be either wholly pneumatic or electro-pneumatic.

An example of a solution of the first kind is illustrated by Figs. 11 and 12.

This embodiment includes three cocks 32, the first two of which are located on either side of the vehicle, for controlling the operation of the doors from the outside, and third one on the inside of said vehicle.

The casing of each of these cocks is in communication on the one hand with the discharge conduit 31 and with a connection conduit leading to the output of the pressure relief device 30, and, on the other hand, with conduits 34a and 34b leading respectively to the operating cylinder of the door located on the same side of the vehicle as the cock and to the operating cylinder of the other door.

The moving element of each of these cocks 32 is constituted by a plug, for instance of conical shape, provided with a plurality of conduits arranged in such manner that an angular displacement of small amplitude in the clockwise direction causes conduit 34a to be connected with the air feed conduit 33 through conduits 35a, whereas an angular displacement in the same direction but of larger amplitude connects conduit 34b with said compressed air feed conduit 33 through a conduit 35b, other conduits 36a and 36b ensuing, for angular displacements in the opposite direction of different amplitudes the connection with discharge conduit 31 of either conduit 34a or conduit 34b.

A spring 37 is caused to coact with each of the cocks for bringing it back into neutral position.

The operation of each of the outer cocks is effected through safety means such for instance as by a lock 38 of the usual type operable by means of a key 39. The inside cock can be operated by means of a mere milled knob 40.

Such a tele-control system has many advantages the following of which may be particularly mentioned:

It permits independent operation of one or the other of the lateral doors of the vehicle.

It makes it possible to stop either of these doors in any intermediate position, merely by releasing the key or the milled knob so that the cock is returned into neutral position by the action of the return spring.

It prevents any accidental opening of the doors while the vehicle is running and constitutes an efficient protection against burglary when the vehicle is stopped, this result being obtained by a single operation.

It constitutes a central control adapted to be located within easy reach of the driver, for instance by disposing knob 40 on the steering wheel.

It works silently, since the doors do not come to strike violently against the edges of their openings as in existing systems.

The electro-pneumatic construction of the tele-control means is illustrated, by way of example, by Figs. 13 to 16 inclusive.

In this case, each of the working cylinders 10a and 10b is caused to coact with an electro-magnetic valve 41a, 41b, respectively. Each of these valves, as shown by Fig. 14, is arranged in such manner as to permit, according to the position occupied by its core 42, of placing feed conduit 43 in communication either with the pressure relief device 30 through a valve 44, or with a discharge conduit 45, through a valve 46.

These electro-magnetic valves are operated by means of three multiple switches controlled by means of keys or of a milled knob and disposed, as in the above described embodiment, two on the outside and one on the inside of the vehicle, the whole being arranged in such manner that different angular displacements of the switches permit of acting either on one or on the other of said electro-magnetic valves for controlling the doors.

In Figs. 15 and 16 I have diagrammatically shown the angular spacings to be provided and the connections to be made between the contact studs 47 of the two stages 48a and 48b of a given switch that correspond respectively to the operation of each of the valves 41 and therefore of each of the doors.

Fig. 13 is a general view of the connections of the system.

Whatever be the construction of the tele-control means in question, it is preferable further to provide emergency means for at least starting the opening of the doors in case of failure of the tele-control means to operate. Once this opening is started through these emergency means, it will be easy to finish the opening operation manually.

Such emergency means may for instance include, as shown by Fig. 5, at the lower end of cylinder 10, a kind of jack 49 adapted to be moved in the axial direction by a sleeve 50 provided with inner threads and having, on its periphery, teeth adapted to cooperate with an endless screw 51.

This endless screw is actuated by means of a lock key 52 of the kind of those used for controlling the cocks or switches of the tele-control system.

Figure 20:
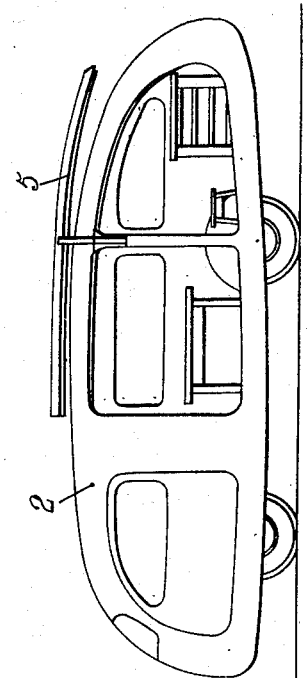
Figs. 19 and 20 show vehicles of different types fitted with doors according to the invention.

Although, in the preceding description, the door construction according to the invention has been supposed to be more particularly applied to the case of a touring car, it must be well understood that it can also be applied with advantage to other vehicles, for instance to delivery vehicles, as shown by Fig. 19, or to camping vehicles, as shown by Fig. 20.

In these cases, I obtain, in addition to the advantages above set forth,

That of ensuring a very easy access to the inside of the vehicle body which facilitates the handling of the goods, And that of reducing to a minimum the place occupied by the vehicle, so that a greater number of vehicles can be loaded or unloaded in a given area.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principles of the present invention as comprehended within the scope of the appended claims.

What I claim is:

1. In a vehicle, a body provided in one side thereof with a door opening, a bracing upright extending across said opening in the middle part thereof, a door adapted to close said opening, an elongated member slidable along said upright, an arm fixed at its upper end to said door, elastic means connecting the lower end of said arm with the upper end of said elongated member so as to urge said two last mentioned parts toward alinement with each other, a piece longitudinally slidable along said member, link means extending from an intermediate point of said arm located on the side thereof turned toward said body to a point of said sliding piece, an abutment carried by said body adapted to cooperate with said sliding piece for limiting the upward displacement thereof, means for elastically urging said elongated member toward the lower position thereof, abutment means for limiting the upward displacement of said elongated member with respect to said sliding piece, and means for imparting an upward displacement to said elongated member with respect to said upright.

2. A combination according to claim 1 further including cooperating guiding means on said door and said body adapted to limit the amplitude of the slight deviation displacements that may occur between said door and said body as long as said door is far from its closed position and imperatively to guide said door with respect to said body when said door is getting near its closed position.

3. A combination according to claim 1 in which said elastic means connecting said arm with said elongated member consist of a rubber block fixed by adhesion to the corresponding ends of said two parts.

4. A combination according to claim 1 including a rocking part carrying the first mentioned abutment and pivoted to said body, said part being adapted, when the elongated member is at the end of its downward movement, to bear upon the upper end of said arm so as to act as part of the means for urging the elongated member toward the lower position thereof, and a spring adapted to cooperate with said rocking part so as to constitute the remainder of the last mentioned means.

5. A combination according to claim 1 in which the second mentioned abutment means is constituted by a portion of the sliding piece, at the lower part thereof.

6. A combination according to claim 1 in which at least one of the two interconnected ends of said arm and said elongated member is bevelled, with its edge parallel to the fore-and-aft direction of the vehicle.

7. A combination according to claim 1 in which a cylinder is fitted inside said upright, the elongated member constituting a piston cooperating with said cylinder, the means for imparting an upward displacement to said elongated member with respect to said upright including a source of compressed fluid, and means for distributing fluid under pressure from said source to the lower end of said cylinder.

8. A combination according to claim 1 in which the last mentioned means include both power means for producing said upward displacement and emergency means for at least starting said displacement in case of breakdown of said power means.

9. In a vehicle, a body provided with a door opening in one of its sides, a single rigid door panel shaped to fit in said opening so as to close it, a part carried by said body movably with respect thereto along a path substantially parallel to said side of the body and located at least substantially in a plane transverse to said vehicle and passing through said opening, and hinge means for pivotally connecting said part with a portion of said door panel intermediate between the top and bottom thereof about an at least substantially horizontal and longitudinal axis.

10. In a vehicle, a body provided with a door opening in one of its sides, a single rigid door panel shaped to fit in said opening so as to close it, a part carried by said body movably with respect thereto along a path substantially parallel to said side of the body and located at least substantially in a plane transverse to said vehicle and passing through said opening, hinge means for pivotally connecting said part with a portion of said door panel intermediate between the top and bottom thereof about an at least substantially horizontal and longitudinal axis, and mechanical means between said part and said door panel for automatically pivoting said door panel outwardly about said hinge means in response to an upward movement of predetermined amplitude of said part.

11. In a vehicle, a body provided with a door opening in one of its sides, a bracing upright extending across said opening in the middle part thereof, a single rigid door panel shaped to fit in said opening so as to close it, a part carried by said upright movably with respect thereto along a path substantially parallel to said side of the body and located at least substantially in the transverse plane of said upright, and hinge means for pivotally connecting said part with a portion of said door panel intermediate between the top and bottom thereof about an at least substantially horizontal and longitudinal axis.

12. In a vehicle, a body provided with a door opening in one of its sides, a bracing upright extending across said opening in the middle part thereof, a single rigid door panel shaped to fit in said opening so as to close it, a part carried by said upright movably with respect thereto along a path substantially parallel to said side of the body and located at least substantially in the transverse plane of said upright, hinge means for pivotally connecting said part with a portion of said door panel intermediate between the top and bottom thereof about an at least substantially horizontal and longitudinal axis, and mechanical means between said part and said door panel for automatically pivoting said door panel outwardly about said hinge means in response to an upward movement of predetermined amplitude of said part.

ROGER LAURENT JEAN
BAPTISTE SANMORI.

REFERENCES CITED

The following references are of record in the file of this patent:

UNITED STATES PATENTS

| Number | Name | Date |
|---|---|---|
| 1,523,704 | Morine | Jan. 20, 1925 |
| 1,855,860 | Mackenzie | Apr. 26, 1932 |
| 1,961,205 | De Vizcaya | June 5, 1934 |
| 2,126,579 | Roethel | Aug. 9, 1938 |
| 2,216,518 | Parsons | Oct. 1, 1940 |
| 2,255,880 | Gregorie | Sept. 16, 1941 |
| 2,416,118 | Parsons | Feb. 18, 1947 |

FOREIGN PATENTS

| Number | Country | Date |
|---|---|---|
| 851,910 | France | Oct. 16, 1939 |